United States Patent
Dooley et al.

(10) Patent No.: US 7,425,029 B2
(45) Date of Patent: Sep. 16, 2008

(54) INTEGRAL CUSHIONED TRIM PANEL FOR A VEHICLE

(75) Inventors: David J. Dooley, Troy, MI (US); Randy S. Reed, Fair Haven, MI (US); Glenn A. Cowelchuk, Chesterfield Township, MI (US); Michael J. Hier, Milford, MI (US); Todd L. DePue, Brighton, MI (US)

(73) Assignee: Lear Corporation, Southfield, MI (US)

( * ) Notice: Subject to any disclaimer, the term of this patent is extended or adjusted under 35 U.S.C. 154(b) by 252 days.

(21) Appl. No.: 10/905,601

(22) Filed: Jan. 12, 2005

(65) Prior Publication Data

US 2006/0154028 A1 Jul. 13, 2006

(51) Int. Cl.
  *B60R 13/02* (2006.01)
(52) U.S. Cl. .................. 296/1.08; 296/146.7; 280/751; 264/46.5; 264/510
(58) Field of Classification Search ............... 296/146.7, 296/1.08, 39.1; 280/751, 752; 264/46.5, 264/510
See application file for complete search history.

(56) References Cited

U.S. PATENT DOCUMENTS

| | | | |
|---|---|---|---|
| 4,869,543 A | 9/1989 | Grimes | |
| 5,275,779 A | 1/1994 | Marfilius et al. | |
| 5,290,087 A | 3/1994 | Spykerman | |
| 5,395,161 A | 3/1995 | Spykerman et al. | |
| 5,464,272 A | 11/1995 | Spykerman et al. | |
| 6,168,188 B1 * | 1/2001 | Preisler et al. | ........... 280/728.3 |
| 6,213,538 B1 | 4/2001 | Scheidmantel et al. | |
| 6,248,205 B1 | 6/2001 | Scheidmantel et al. | |
| 7,005,092 B2 * | 2/2006 | Dooley et al. | .............. 264/46.5 |
| 7,156,437 B2 * | 1/2007 | Cowelchuk et al. | ........ 296/1.08 |

\* cited by examiner

*Primary Examiner*—Joseph D Pape
(74) *Attorney, Agent, or Firm*—Earl LaFontaine

(57) ABSTRACT

In one advantageous embodiment of the claimed invention, an integral cushioned trim panel (14*a*-14*c*) for a vehicle passenger cabin (10) is provided. The integral cushioned trim panel (14*a*-14*c*) includes a substrate (22) for attachment to a predetermined portion (12*a*-12*c*) of the vehicle. The substrate (22) has a cover member (24) coupled thereto for substantially covering the substrate (22). In addition, the substrate (22) and the cover member (24) have a cushioning member (16) disposed therebetween. The cushioning member (16) is injection molded between the substrate (22) and the cover member (24) for forming an integral construction, minimizing the manufacturing cycle time, and decreasing the costs associated therewith.

10 Claims, 4 Drawing Sheets

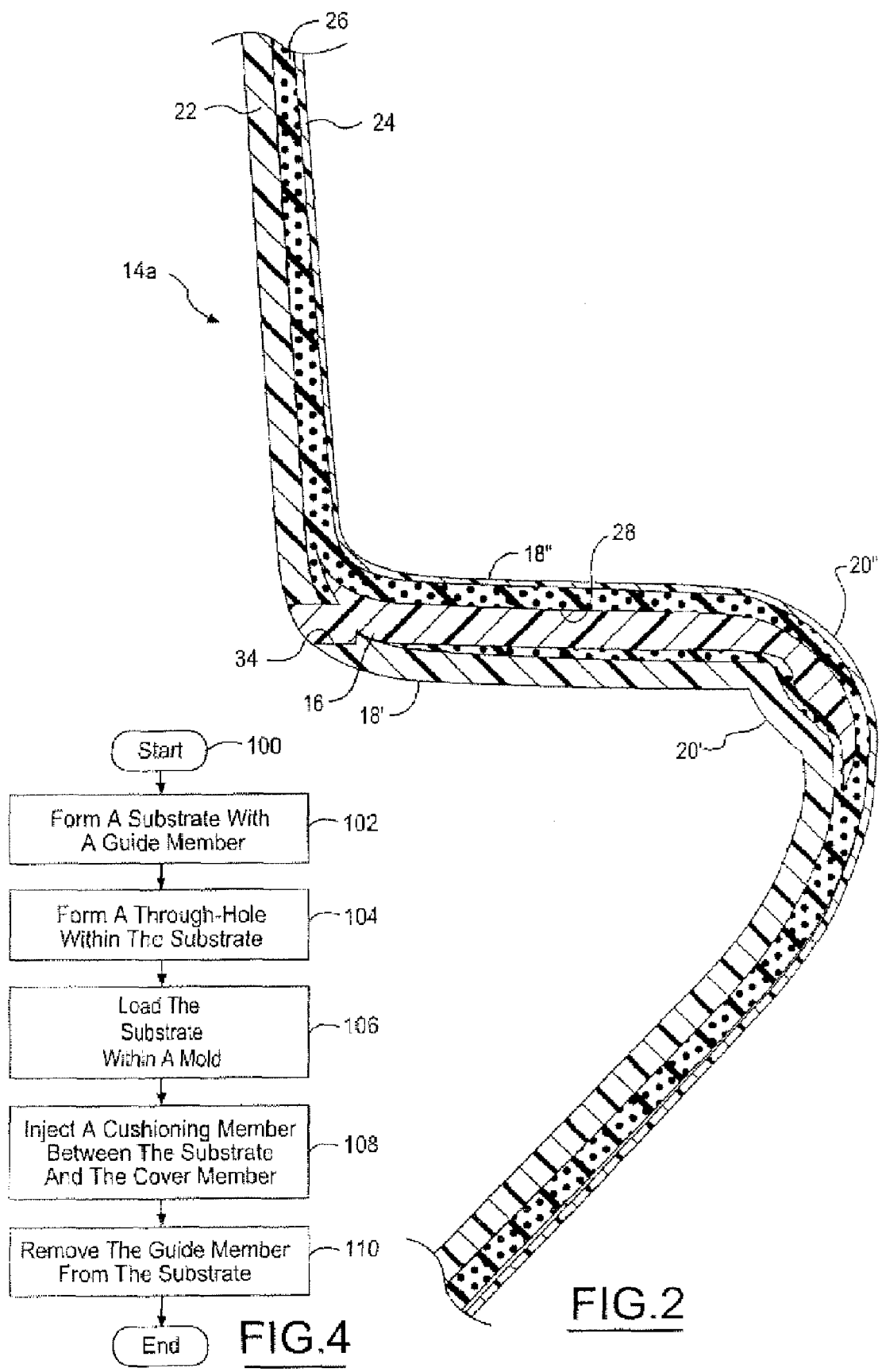

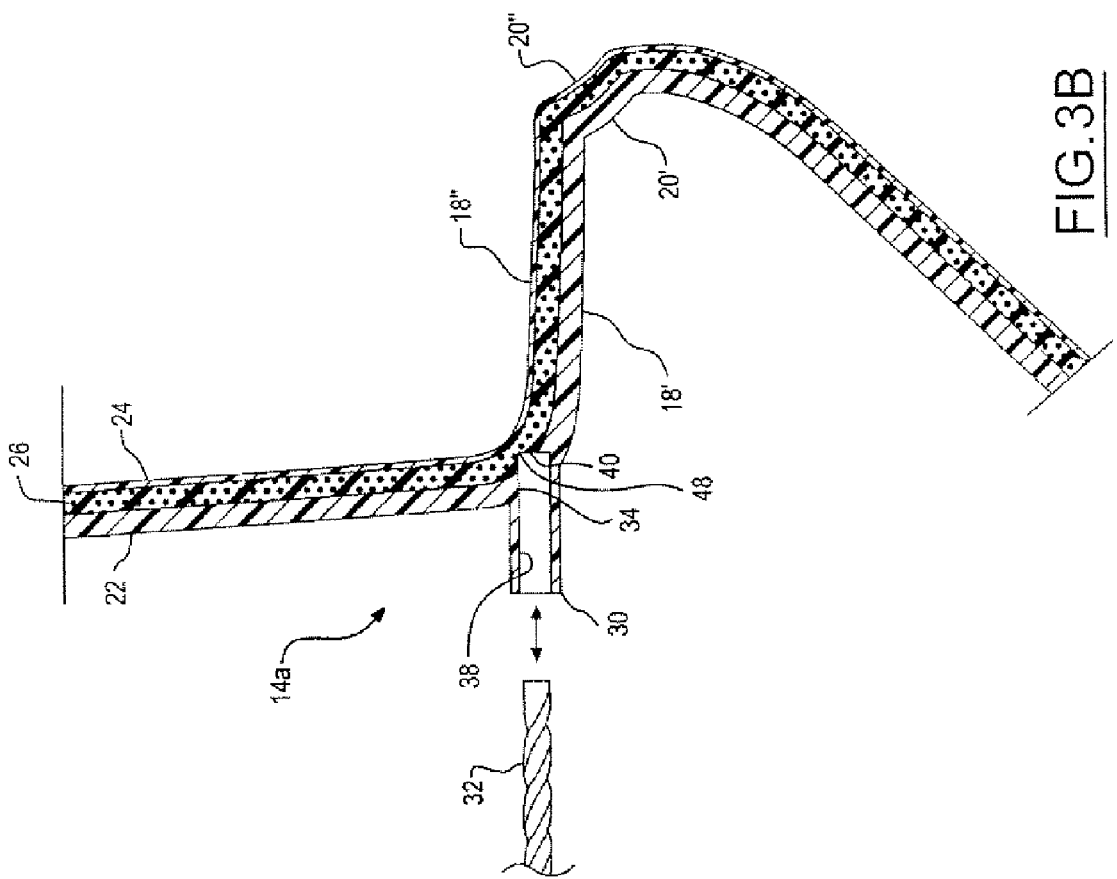
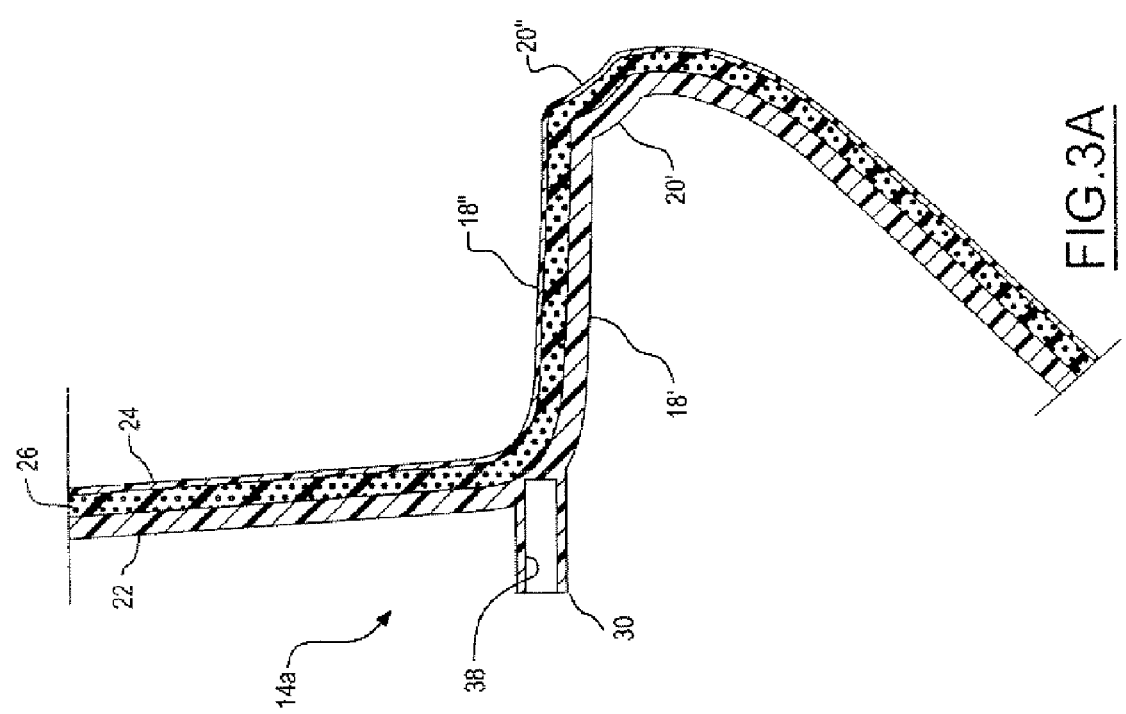

INTEGRAL CUSHIONED TRIM PANEL FOR A VEHICLE

TECHNICAL FIELD

The present invention relates generally to cushioned trim panel assemblies for vehicles, and more particularly to an integral cushioned trim panel, which improves the aesthetics of a vehicle passenger cabin, decreases the manufacturing cycle time, and minimizes the costs associated therewith.

BACKGROUND OF THE INVENTION

Cushioned trim panel assemblies for vehicles are well known. For example, one known cushioned trim panel assembly is a door inner trim panel assembly, which generally includes a door trim panel secured to a door inner panel, a cover stock attached to the door trim panel, and a separate armrest device that is coupled to the door trim panel.

The separate armrest device typically is attached to the door trim panel during a post-molding assembly process. One skilled in the art will understand that the installation of the separate armrest device can be somewhat difficult with regard to providing a desired fit and finish. In addition, the armrest device and the cover stock typically have a visible gap therebetween, which can diminish the aesthetics of the door.

It would therefore be desirable to provide an integral cushioned trim panel having substantially few components so as to minimize the manufacturing cycle time, decrease the costs associated therewith, and improve the vehicle aesthetics.

SUMMARY OF THE INVENTION

In one advantageous embodiment of the claimed invention, an integral cushioned trim panel for a vehicle is provided. The integral cushioned trim panel includes a substrate for attachment to a predetermined portion of the vehicle. The substrate has a cover member coupled thereto for substantially covering the substrate. In addition, the substrate and the cover member have a cushioning member disposed therebetween. The cushioning member is injection molded between the substrate and the cover member for providing an integral construction.

One advantage of the present invention is that an integral cushioned trim panel is provided that has a substantially low manufacturing cycle time, as well as substantially low costs associated therewith.

Another advantage of the present invention is that an integral cushioned trim panel is provided that has relatively few components for providing a simple integral construction.

Yet another advantage of the present invention is that an integral cushioned trim panel is provided that enhances the aesthetics of a vehicle passenger cabin, as well as the aesthetics of other suitable environments within which the panel is utilized.

Other advantages of the present invention will become apparent when viewed in light of the detailed description of the invention in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention:

FIG. 2 is a cross-sectional view of the integral cushioned trim panel shown in FIG. 1, as taken along line 2-2;

FIG. 3A is a cross-sectional view of the integral cushioned trim panel shown in FIG. 2 during a first step of manufacture, illustrating the integral cushioned trim panel having a substrate with a guide member extending therefrom, a cover member coupled to the substrate, and a padding member sandwiched between the substrate and the cover member;

FIG. 3B is a cross-sectional view of the integral cushioned trim panel shown in FIG. 3A during a second step of manufacture, illustrating the substrate and the padding member respectively having a through-hole and a recess formed therein for receiving a injection molding nozzle;

FIG. 4 is a logic flow diagram of method for manufacturing the integral cushioned trim panel shown in FIG. 2.

DETAILED DESCRIPTION OF THE INVENTION

Figure 1:
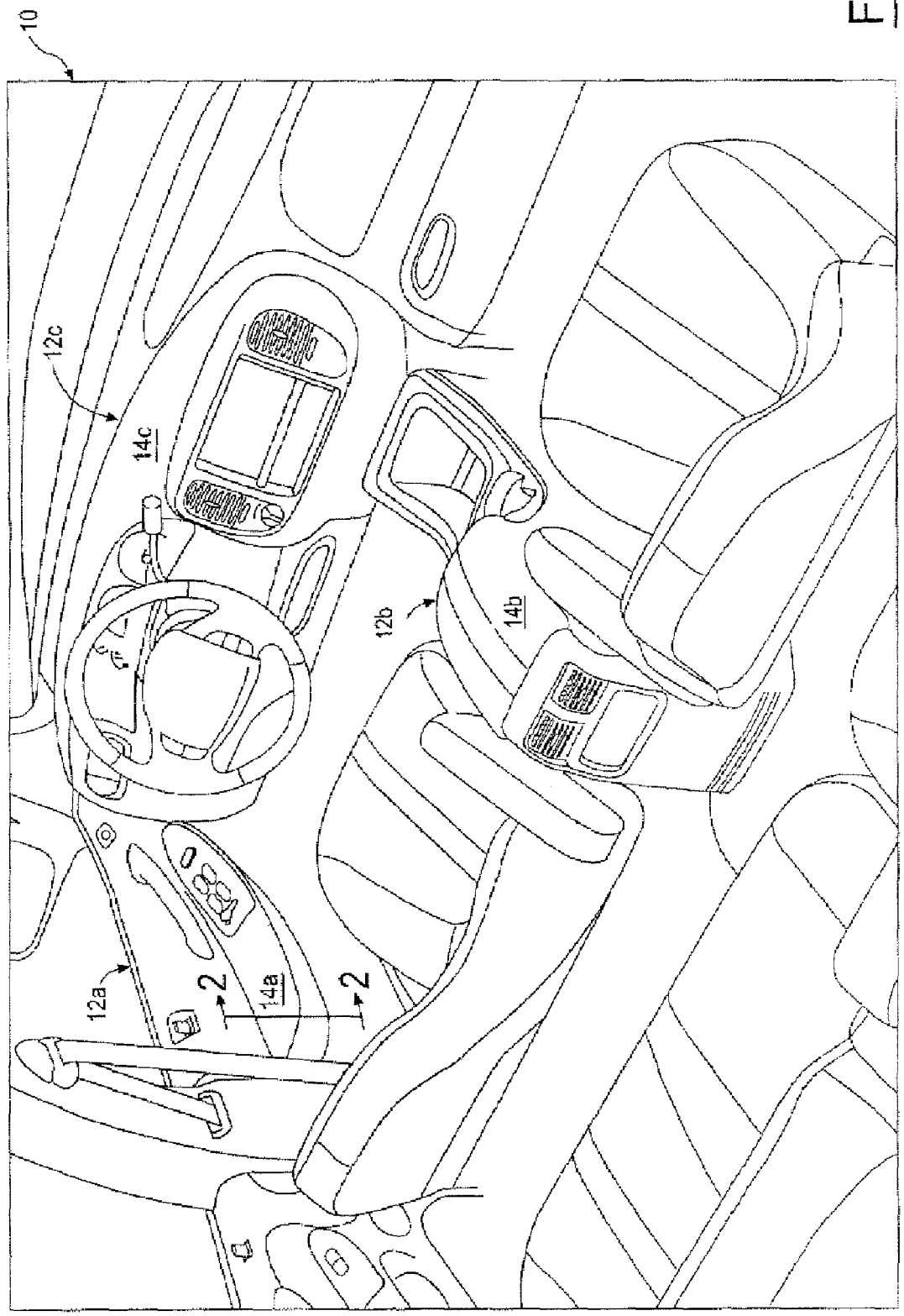
FIG. 1 is a perspective view of a vehicle passenger cabin having a series of predetermined portions each with an integral cushioned trim panel mounted thereon, according to one advantageous embodiment of the claimed invention.

In the following figures, the same reference numerals are used to identify the same components in the various views. Furthermore, the illustrated embodiments described herein employ features where the context permits. Specifically, the embodiments described herein implement an integral cushioned trim panel attached to various portions of a vehicle passenger cabin. However, it is contemplated that the integral cushioned trim panel can instead be mounted to other suitable portions of the passenger cabin and/or the vehicle cargo area, e.g. trunk. Likewise, it is understood that the integral cushioned trim panel can be utilized within various other suitable environments as desired. In this regard, other embodiments are contemplated lacking one or more of the described features, having features other than those described herein, or having different combinations of those features. It is therefore appreciated that the invention can be carried out in a variety of suitable modes.

Referring to FIG. 1, there is shown a perspective view of a vehicle passenger cabin 10 having a series of predetermined portions 12a-12c each respectively with an integral cushioned trim panel 14a-14c ("trim panels") mounted thereon, according to one advantageous embodiment of the claimed invention. Specifically, in this embodiment, the trim panels 14a-14c are respectively secured to a pair of vehicle doors 12a, a center console 12b, and an instrument cluster 12c. It will be appreciated that each trim panel 14a-14c has a predetermined construction for sufficiently covering the structure of the respective portion 12a-12c of the passenger cabin 10.

With attention now to FIG. 2, there is shown a cross-sectional view of the trim panel 14a mounted to the vehicle door 12a, as shown in FIG. 1 and as taken along line 2-2. As introduced above, the trim panels 14a-14c each have a predetermined shape and a predetermined size for attachment respectively to the vehicle doors 12a, the center console 12b, and the instrument cluster 12c. However, each trim panel 14a-14c has a similar construction and a similar method of manufacture. For that reason, the trim panel 14a as detailed below is representative of the construction and the method of manufacture of the other trim panels 14b, 14c.

Specifically, the trim panel 14a provides an integral construction having a cushioning member 16 as a component thereof. The integral construction of the trim panels 14a dispenses with the need for a conventional post-molding assembly process that typically is utilized for attaching a separate cushion device to the trim panel 14a. For that reason, the trim panel 14a can be manufactured with generally few steps within a generally short amount of time.

In addition, in this embodiment, the cushioning member 16 is comprised of a thermoplastic elastomer, which is sufficiently deformable for gradually distributing even support to a load imparted thereon. Specifically, the cushioning members 16 are disposed within respective generally-horizontal portions 18', 18" of the trim panels 14a, 14b and are sufficiently deformable for providing comfortable armrests for the driver-side occupant and the passenger-side occupant. Also, these cushioning members 16 are disposed between respective corner portions 20', 20" of each trim panel 14a, 14b for substantially cushioning a force imparted thereon. It will be appreciated that integrating the cushioning members 16 within the corner portions 20', 20" minimizes the substantially high force that can otherwise be concentrated at a generally sharp corner.

It is understood that the cushioning member 16 can be located at various suitable portions of the trim panels 14a-14c instead of the horizontal portions 18', 18" and the corner portions 20', 20". By way of example, the cushioning member 16 can extend across the entire trim panel 14a as desired.

Moreover, in this embodiment, the corner portion 20' has a chamfered construction for further minimizing the concentration of force otherwise produced by a generally sharp corner. The chamfered corner portion 20' also has a substantial amount of the cushioning member 16 disposed adjacent thereto for further cushioning a load imparted on the trim panel 14a.

However, it is contemplated that the cushioning member 16 can be comprised of various other suitable materials instead of a thermoplastic elastomer. In addition, it is understood that the cushioning member 16 can have a larger or smaller modulus of elasticity for accomplishing other suitable functions.

For instance, the trim panel 14c, which is mounted to the instrument cluster 12c, can include a cushioning member 16 that has a sufficient modulus of elasticity for absorbing a substantially high amount of a vehicle occupant's kinetic energy during a collision.

Turning back to FIG. 2, the trim panel 14a includes a substrate 22 and a cover member 24 coupled to the substrate 22 via suitable conventional fasteners (not shown). The cover member 24 is a flexible layer of synthetic material that is contoured substantially flat adjacent to the substrate 22. For example, the cover member 24 can be a bi-laminate cover stock that is comprised of a cloth material. However, it will be appreciated that the cover member 24 can be comprised of a PVC material or various other suitable materials as desired. Furthermore, it is also understood that the cover member 24 can have other suitable constructions. The substrate 22 and the cover member 24 are detailed in the descriptions for FIGS. 3A, 3D, and 4.

The cover member 24 substantially covers the cushioning member 16 so as to provide a substantially integral construction. In this way, the cover member 24 eliminates the visibility of gaps between the cushioning member 16 and the substrate 22. This feature is beneficial for enhancing the aesthetics of the trim panel 14a. However, it is understood that the cover member 24 can instead cover less than the entire cushioning member 16 as desired.

In this embodiment, the substrate 22 and the cover member 24 have a padding member 26 sandwiched therebetween. The padding member 26 defines pocket 28 for receiving the cushioning member 16. This padding member 26 is comprised of a layer of deformable foam material and is sized for extending substantially across the substrate 22. In one embodiment, the padding member 26 and the cover member 24 form two layers of the bi-laminate cover stock mentioned hereinabove. However, it will be appreciated that the padding member 26 can instead be comprised of various other suitable materials and have other constructions as desired. In addition, it is understood that the padding member 26 can be omitted from the trim panel 14a as desired. The pocket 28 is further detailed in the descriptions for FIGS. 3D and 4.

In another embodiment, the cushioning member 16 is sandwiched immediately between the padding member 26 and the substrate 22, instead of being disposed within the pocket 28 of the padding member 26. Moreover, in yet another embodiment, the cushioning member 16 is sandwiched immediately between the padding member 26 and the cover member 24. In this way, it will be appreciated that the padding member 26 can lack the pocket 28. Likewise, it is understood that the cushioning member 16 can be disposed between the substrate 22 and the cover member 24 in various suitable ways.

Referring now to FIG. 4, there is shown a logic flow diagram of a method for manufacturing the trim panel 14a illustrated in FIG. 2. The method commences in step 100 and then immediately proceeds to step 102.

In step 102, the substrate 22 is formed with the guide member 30 integrated therein by way of an injection molding process or other suitable manufacturing process. As best shown FIG. 3B and as detailed in step 104, the substrate 22 has a guide member 30 for directing a drill member 32 for drilling a through-hole 34 in a predetermined portion of the substrate 22. In addition, as shown in FIG. 3B and as detailed in step 108, the guide member 30 also is utilized for receiving an injection molding nozzle 36 for injecting the cushioning member 16 through the through-hole 34 between the substrate 22 and the cover member 24.

In this embodiment, the guide member 30 is a boss having a hollow shaft 38 for receiving and guiding the drill member 32. However, it is contemplated that the guide member 30 can instead be a groove, an aperture, or various other suitable guide members as desired. The sequence then proceeds to step 104.

Figure 3C:
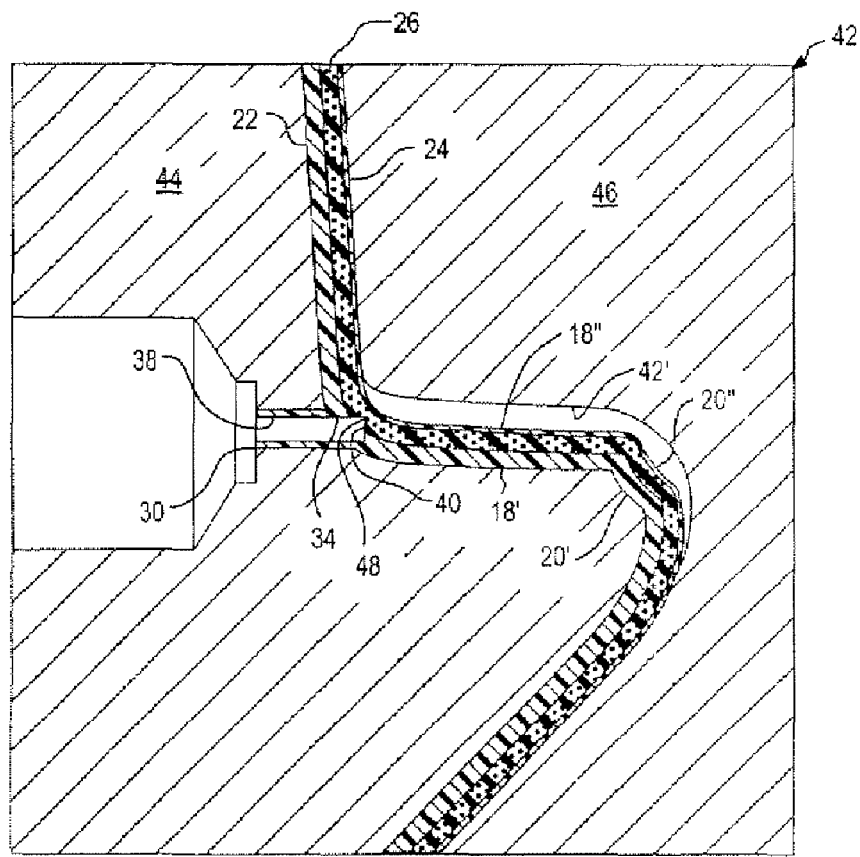
FIG. 3C is a cross-sectional view of the integral cushioned trim panel shown in FIG. 3B during a third step of manufacture, illustrating the integral cushioned trim panel being loaded into a mold.

In step 104, as shown in FIG. 3B and as introduced above, the guide member 30 receives and directs the drilling member 32 for forming the through-hole 34 within a predetermined portion of the substrate 22. In this embodiment, this step is accomplished by utilizing the hollow shaft 38 of the boss for directing the drilling member 32 and forming a through-hole 34 adjacent to the generally horizontal portions 18', 18" of the trim panel 14a. Also in this embodiment, the guide member 30 is utilized for directing the drill member 32 for forming a recess 40 within the padding member 26.

However, in another embodiment, the guide member 30 is an aperture integrally formed through the substrate 22 via the injection molding process in step 102. In this way, the aperture can receive the injection molding nozzle 36 for injecting the cushioning member 16 through the aperture between the substrate 22 and the cover member 24. For that reason, in that embodiment, step 104 is omitted. The sequence then continues to step 106.

Figure 3D:
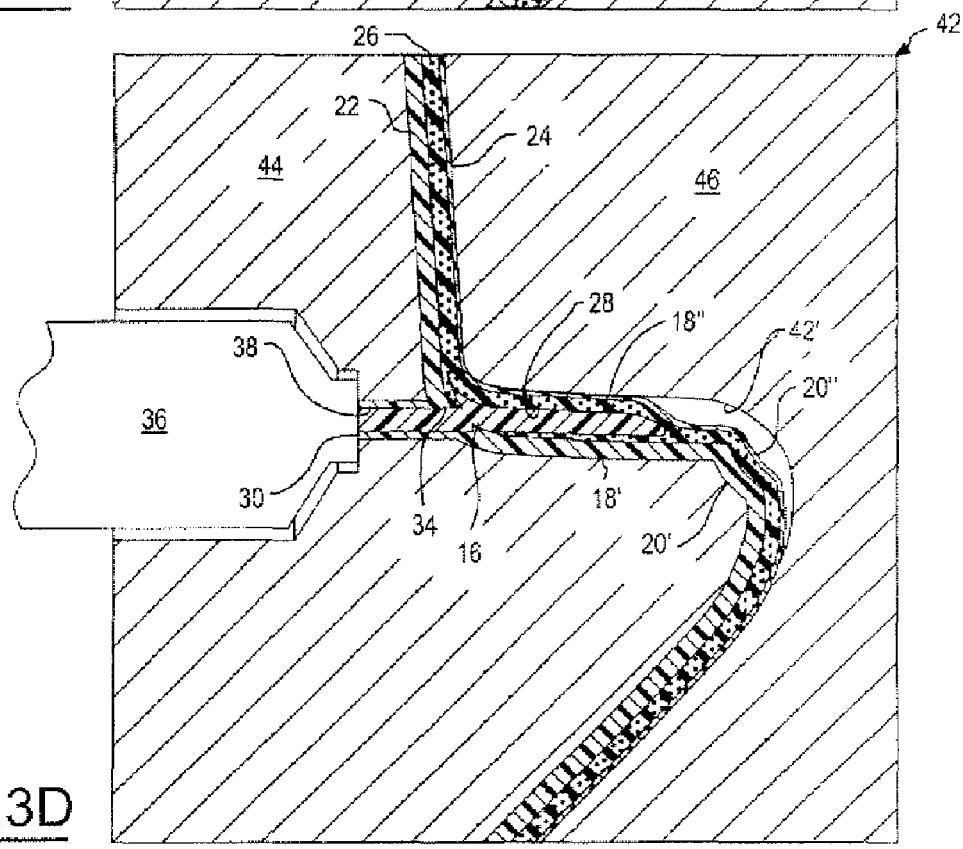
FIG. 3D is a cross-sectional view of the integral cushioned trim panel shown in FIG. 3C during a fourth step of manufacture, illustrating the padding member receiving the cushioning member between the substrate and the cover member.

In step 106, the trim panel 14a is loaded into a mold 42 having a first portion 44 and a second portion 46 that is opposite to the first portion 44. As shown in FIG. 3D, the first portion 44 and the second portion 46 have a predetermined construction for defining a cavity 42' that is sized for forming the cushioning member 16 with a predetermined shape and a predetermined size across a predetermined section of the substrate 22. In that way, as exemplified above, the mold 42 can be utilized for forming the cushioning member 16 respectively between the generally horizontal portions 18', 18" and the corner portions 20', 20" of the substrate 22 and the cover member 24. Yet, it is contemplated that the mold 42 can have other suitable constructions for forming the cushioning member 16 across other portions of the trim panel 14a. In addition, it is understood that the mold 42 can have other suitable constructions for forming the cushioning member 16 with various other shapes and sizes as desired. Then, the sequence immediately proceeds to step 108.

In step 108, as shown in FIG. 3D and as introduced above, the guide member 30 receives and directs the injection molding nozzle 36 for injecting the material, which comprises the cushioning member 16, between the cover member 24 and the substrate 22. In one embodiment, the injection molding nozzle 36 utilizes substantially low pressure for injecting a thermoplastic elastomer ("TPE") with blowing agents for forming the cushioning member 16 between the cover member 24 and the substrate 22. In that way, the cushioning member 16 has a foamed cell structure. The flow of TPE into the trim panel 14a is limited by a predetermined amount of pressure, which is applied to the trim panel 14a by the mold 42 in its closed position. It is contemplated that the cushioning member 16 can instead be comprised of other suitable materials and other structures as desired.

Also in this embodiment, the injection molding nozzle 36 injects the cushioning member 16 at a stress-riser portion 48, e.g. sharp corner, of the recess 40 so as to tear the padding member 26, form a pocket 28 therein, and fill the pocket 28. However, it is contemplated that the padding member 26 can instead have the pocket 28 previously formed therein via other suitable manufacturing processes as desired. The sequence then proceeds to step 110.

In step 110, the trim panel 14a is removed from the mold 42 and the guide member 30 is cut or otherwise excised from the substrate 22.

While particular embodiments of the invention have been shown and described, numerous variations and alternate embodiments will occur to those skilled in the art. Accordingly, it is intended that the invention be limited only in terms of the appended claims.

What is claimed is:

1. An integral cushioned trim panel for a vehicle, comprising:
   a substrate for attachment to a predetermined portion of the vehicle;
   a cover member coupled to said substrate and substantially covering said substrate; and
   a cushioning member disposed between said substrate and said cover member, said cushioning member being injection molded between said substrate and said cover member for minimizing the manufacturing cycle time and the costs associated therewith; and
   an elongated guide member on said substrate for receiving an injection molding nozzle for injecting said cushioning member between said substrate and said cover member.

2. The integral cushioned trim panel recited in claim 1 wherein said cover member is sufficiently flexible for receiving said cushioning member between said substrate and said cover member, said cover member being contoured for being disposed against said cushioning member and said substrate.

3. The integral cushioned trim panel recited in claim 1 wherein said cushioning member is disposed between a pair of respective generally horizontal portions of said substrate and said cover member.

4. The integral cushioned trim panel recited in claim 1 wherein said cushioning member is disposed between a pair of respective corner portions of said substrate and said cover member.

5. The integral cushioned trim panel recited in claim 1 wherein said substrate has a chamfered corner portion formed therein.

6. The integral cushioned trim panel recited in claim 1 wherein said predetermined portion of said vehicle is at least one of an arm rest portion, a center console portion, and an instrument cluster portion of the vehicle.

7. An integral cushioned trim panel for a vehicle, comprising:
   a substrate for attachment to a predetermined portion of the vehicle;
   a cover member coupled to aid substrate for substantially covering said substrate; a
   padding member disposed between said substrate and said cover member;
   a cushioning member disposed between said substrate and said substrate and said cover member, said cushioning member being injection molded between said substrate and said cover member for minimizing manufacturing cycle time and costs associated therewith;
   an elongated guide member on said substrate for receiving an injection molding nozzle for injecting said cushioning member between said substrate and said cover member.

8. The integral cushioned trim panel recited in claim 7 wherein said cushioning member is injection molded within said padding member.

9. The integral cushioned trim panel recited in claim 8 wherein said padding member has a recess formed therein for injecting said cushioning member thin said padding member.

10. The integral cushioned trim panel recited in claim 7 wherein said cushioning member is a thermoplastic elastomer.

* * * * *